United States Patent
Taniguchi (10) Patent No.: US 6,700,357 B2
(45) Date of Patent: Mar. 2, 2004

(54) ELECTROMAGNETIC WAVE NOISE ENTRY INHIBITING CONNECTOR FOR VEHICULAR AC GENERATOR CONTROL DEVICE

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 306 days.

(21) Appl. No.: 09/736,251

(22) Filed: Dec. 15, 2000

(65) Prior Publication Data

US 2002/0057026 A1 May 16, 2002

(30) Foreign Application Priority Data

Dec. 16, 1999 (JP) ............................... 11-357627
Oct. 17, 2000 (JP) ...................................... 2000-316455

(51) Int. Cl.$^7$ .............................. H02J 7/14; H02P 9/00; H01R 13/66; H01R 33/00
(52) U.S. Cl. ............................. 322/99; 322/44; 322/58; 322/59; 322/69; 322/70; 439/620
(58) Field of Search ................................ 322/44, 58–59, 322/69–70, 99; 439/620

(56) References Cited

U.S. PATENT DOCUMENTS

| | | | | |
|---|---|---|---|---|
| 4,329,665 A | * | 5/1982 | Kawai et al. ................ | 333/182 |
| 4,407,552 A | * | 10/1983 | Watanabe et al. ............ | 439/608 |
| 4,470,004 A | * | 9/1984 | Morishita et al. ............ | 320/136 |
| 4,471,288 A | * | 9/1984 | Morishita et al. ............ | 320/123 |
| 4,516,815 A | * | 5/1985 | Venable et al. ............... | 439/95 |
| 4,590,415 A | * | 5/1986 | Iwaki et al. .................. | 320/123 |
| 4,784,618 A | * | 11/1988 | Sakamoto et al. ........... | 439/620 |
| 4,995,834 A | * | 2/1991 | Hasegawa .................... | 439/620 |
| 5,034,846 A | * | 7/1991 | Hodge et al. ................ | 361/119 |
| 5,088,939 A | * | 2/1992 | Shepherd ..................... | 439/620 |
| 5,213,522 A | | 5/1993 | Kojima ........................ | 439/620 |
| 5,240,436 A | * | 8/1993 | Bradley et al. .............. | 439/654 |
| 5,512,812 A | * | 4/1996 | Ono .............................. | 322/21 |
| 5,581,172 A | * | 12/1996 | Iwatani et al. ................ | 322/24 |
| 5,675,237 A | * | 10/1997 | Iwatani ........................ | 322/28 |
| 5,760,486 A | * | 6/1998 | Uchinami et al. ......... | 290/40 C |
| 5,895,293 A | * | 4/1999 | Brandberg et al. ........... | 439/620 |
| 5,910,030 A | * | 6/1999 | Hollander et al. ........... | 439/620 |
| 5,929,613 A | * | 7/1999 | Tsuchiya et al. ............... | 322/28 |
| 5,997,355 A | * | 12/1999 | Hollander et al. ........... | 439/620 |
| 6,068,513 A | * | 5/2000 | Cameron et al. ............ | 439/620 |
| 6,183,304 B1 | * | 2/2001 | Hollander et al. ........... | 333/181 |
| 6,252,163 B1 | * | 6/2001 | Fujimori et al. ............... | 174/36 |
| 6,267,626 B1 | * | 7/2001 | Hollander et al. ........... | 439/620 |
| 6,313,613 B1 | * | 11/2001 | Iwatani et al. ................ | 322/12 |
| 6,344,734 B1 | * | 2/2002 | Iwatani et al. ................. | 322/28 |
| 6,443,770 B1 | * | 9/2002 | Lin ............................. | 439/620 |
| 6,447,337 B1 | * | 9/2002 | Anderson et al. ............ | 439/620 |
| 6,461,184 B2 | * | 10/2002 | Nimura ....................... | 439/352 |
| 6,469,595 B2 | * | 10/2002 | Anthony et al. ............. | 333/182 |
| 6,478,626 B2 | * | 11/2002 | Dingenotto et al. ......... | 439/620 |
| 6,491,547 B1 | * | 12/2002 | Chen ........................... | 439/620 |
| 6,506,079 B1 | * | 1/2003 | Dingenotto et al. ......... | 439/620 |

FOREIGN PATENT DOCUMENTS

| | | |
|---|---|---|
| EP | 0 363 724 | 4/1990 |
| EP | 0 735 641 A1 | 10/1996 |
| JP | 5-29042 | 2/1993 |
| JP | 5-190620 | 7/1993 |
| JP | 7-115737 | 5/1995 |
| JP | 7-65887 | 7/1995 |

* cited by examiner

Primary Examiner—Burton S. Mullins
Assistant Examiner—Pedro J. Cuevas
(74) Attorney, Agent, or Firm—Oliff & Berridge, PLC (57) ABSTRACT

Magnetic bodies for reducing electromagnetic wave noises are mounted to a battery voltage supplying terminal for supplying of an electric source power for the operation of circuits to an IC chip of a regulator or an internal electric source line for connection of the terminal to the regulator chip. The magnetic bodies are attached to an IG ON terminal for inputting into the regulator chip a voltage signal caused by opening and closing of an ignition switch or to an IG ON detection line for connection of the terminal to the regulator chip. A bypass capacitor is connected to a battery voltage detecting terminal for inputting a change of battery voltage into the regulator chip, or to an internal battery voltage detection line for connection of the terminal to a switching transistor control circuit unit.

13 Claims, 7 Drawing Sheets

ELECTROMAGNETIC WAVE NOISE ENTRY INHIBITING CONNECTOR FOR VEHICULAR AC GENERATOR CONTROL DEVICE

CROSS-REFERENCE TO RELATED APPLICATION

The present invention is related to Japanese patent application No. Hei. 11-357627, filed Dec. 16, 1999; 2000-316455, filed Oct. 17, 2000, the contents of which are incorporated herein by reference.

FIELD OF THE INVENTNION

The invention relates to a control device for a vehicular AC generator, and more particularly, to a control device for a vehicular AC generator having a connector with an electromagnetic wave noise preventing function.

BACKGROUND OF THE INVENTION

In recent years, there has been an increase in high frequency electromagnetic field in vehicles as portable telephones and navigation systems prevail.

Since influences given to electronic equipment by electromagnetic waves of a particular intensity increase with an increase in frequency, there is a demand to reduce adverse influences given to a control device for a vehicular AC generator, by high frequency radio waves used in portable telephones or the like. At the same time, there is a demand to reduce adverse influence given to on-board electronic devices, the above-mentioned portable telephones and navigation systems, by electromagnetic wave noises, which are generated from a control device (also, referred to as a regulator) for a vehicular AC generator. Much of these electromagnetic wave noises flows through wiring inside and outside the electronic devices and adversely affects the operation of elements in the electronic devices. Such wiring inducing noises are called hereinafter line superposed noises.

It has been conventionally known to mount and connect ferrite ring cores, feed-through capacitors, bypass capacitors or the like to wiring to reduce such line superposed noises. These elements constitute a low-pass filter composed of line inductance or wiring resistance and bypass capacitance including parasitic capacitance, and shut off or reduce high frequency electromagnetic wave noises.

For example, Japanese Patent Laid-Open No. 190620/1993 proposes a connector having an electromagnetic wave noise preventing function and housing therein or fixing integrally thereto a cylindrical-shaped noise absorbing member, which surrounds terminals of the connector and comprises ferrite ring cores or feed-through capacitors.

Also, Japanese Patent Laid-Open No. 29042/1993 proposes pressure fitting and fixing ferrite ring cores to a wall portion of a housing to have the ferrite ring cores surrounding terminals of a connector fixed to the wall portion.

Further, Japanese Patent Laid-Open No. 115737/1995 proposes suppressing entry of electromagnetic wave noises from a L terminal by providing a bypass capacitor between a pair of positive and negative input ends of a comparator for comparison and determination of battery voltage fluctuations of a control device (referred below to as a regulator) for a vehicular AC generator.

A conventional regulator for a vehicular AC generator comprises an output circuit unit including a switching transistor connected at one end thereof to one end of a battery through a field coil of the vehicular AC generator and at the other end thereof to the other end of the battery. This regulator performs intermittent control of current conducted to the field coil. An internal electric source circuit unit is supplied with electricity from the battery to form an internal electric source voltage. A switching transistor control circuit unit is actuated by the internal electric source voltage and performs intermittent control of the switching transistor based on battery voltage and a predetermined target voltage. A battery voltage supplying terminal is connected to a high potential end of the battery for supplying electricity to the internal electric source circuit unit via an internal electric source line. A battery voltage detecting terminal is connected to a high potential end of the battery for permitting voltage of the battery to be input into the switching transistor control circuit unit through an internal battery voltage detection line. An IG ON detection terminal connected to one end of an ignition switch to permit voltage change caused by the ignition switch to be input into the switching transistor control circuit unit through an IG ON detection line. The control device is fixed to the vehicular AC generator.

Experiments performed by the inventors of this application have revealed that with the constitution disclosed by the above-mentioned Japanese Patent Laid-Open No. 115737/1995, in which a bypass capacitor is used to reduce electromagnetic wave noises entering from a L terminal serving also as an IG terminal of a regulator, the effect of reducing entry of electromagnetic wave noises into the regulator is restricted, and such constitution is not effective in reduction of electromagnetic wave noises generated from the regulator. This is because the regulator includes a number of wires and thus paths of entry and irradiation of electromagnetic wave noises from the regulator.

Of course, if ferrite ring cores and bypass capacitors are provided for all wires of the regulator, it is possible to reduce electromagnetic wave noise entering the regulator via these wires. However, the provision of ferrite ring cores and bypass capacitors on all wires of a regulator mounted on an on-board vehicular AC generator is impossible in terms of cost and allowable installation space. In particular, since a regulator mounted on a vehicular AC generator disposed near an internal combustion engine is used during high temperature and intense vibrations, bypass capacitors of large capacity with an adequate noise reducing performance must have heat resistant and vibration resistant qualities and be large in size, which presents a further problem in terms of cost and an installation space.

SUMMARY OF THE INVENTION

It is therefore an object of the present invention to provide a control device for a vehicular AC generator, preventing entry of electromagnetic wave noises while suppressing an increase in physical dimensions, and a connector suitable for application to the device.

A control device for a vehicular AC generator, in a first aspect comprises a field current switching circuit unit having a switching transistor switching current conducted to a field coil, a switching transistor control circuit unit for performing intermittent control of the switching transistor based on a battery voltage and a predetermined target voltage, an internal electric source circuit that uses electricity supplied from the battery to form an internal electric source voltage applied to the switching transistor control circuit unit, a casing containing ICs mold-sealed by the respective circuit units, a battery voltage supplying terminal for supplying electricity to the internal electric source circuit unit from the battery via an internal electric source line, and a magnetic body mounted to the internal electric source line or the battery voltage supplying terminal, and in the control device, the battery voltage supplying terminal and the magnetic body are fixed to the casing.

A second aspect of the invention uses a field current switching circuit unit having a switching transistor for performing switching control of current conducted to a field coil, a switching transistor control circuit unit for performing intermittent control of the switching transistor based on a battery voltage and a predetermined target voltage, an internal electric source circuit unit for using electricity supplied from the battery to form an internal electric source voltage being applied to the switching transistor control circuit unit, a casing containing therein ICs mold-sealed by the respective circuit units or the respective circuit units, a battery voltage supplying terminal for supplying electricity to the internal electric source circuit unit from the battery via an internal electric source line, and an inductance element connected in series to the internal electric source line. In the control device, the battery voltage supplying terminal and the inductance element are fixed to the casing.

Another aspect of the invention comprises a battery voltage detecting terminal connected to a high potential end of the battery for permitting voltage of the battery to be input into the switching transistor control circuit unit through a battery voltage detection line, and a high frequency bypass capacitor connecting between the battery voltage detection line or the battery voltage detecting terminal and a potential source at a potential equal to a negative potential of the battery. The battery voltage detecting terminal and the high frequency bypass capacitor are fixed to the casing.

In the above described aspect, magnetic bodies for reduction of electromagnetic wave noises are mounted to a battery voltage supplying terminal (BR terminal) for supplying of an electric source power for the operation of circuits to a regulator (in particular, its switching transistor control circuit unit) or an internal electric source line for connection of the terminal to an internal circuit of the regulator. They are also connected to an IG ON detection terminal (a conventional IG terminal or a L terminal (also detecting opening and closing of an ignition switch)) for inputting into the regulator (in particular, its switching transistor control circuit unit) a voltage signal caused by opening and closing of the ignition switch or to an IG ON detection line for connection of the detection terminal to the switching transistor control circuit unit of the regulator. A bypass capacitor is connected to a battery voltage detection terminal (S terminal) for inputting a change of battery voltage into the switching transistor control circuit unit of the regulator. The capacitor can be connected to a battery voltage detection line for connection of the terminal to the switching transistor control circuit unit of the regulator, whereby marked reduction of receiving or irradiating (through wiring) of electromagnetic wave noises on the regulator as compared with the prior art can be realized while suppressing physical dimensions and an increase in cost with respect to the regulator.

That is, the bypass capacitor (including a feed-through capacitor) is arranged on the S terminal or on internal battery voltage detection line for connection of the S terminal to the switching transistor control circuit unit of the regulator.

For electromagnetic wave noises entering the regulator from the S terminal, the S terminal is connected via an internal electric source line to a comparator for comparing voltage (comparison between a reference voltage and a battery voltage input from the S terminal), having a high input impedance. In addition, voltage division is sometimes effected in a voltage divider circuit before the voltage is input into the comparator from the S terminal.

Where an external line for connection of the S terminal with the battery voltage is a high frequency noise electric source, load impedance of the high frequency noise electric source composed of resistance of the voltage divider circuit or input impedance of the comparator is fairly large. Therefore, a bypass capacitor is connected thereto in parallel, whereby most of high frequency electromagnetic wave current is made to easily flow through the bypass capacitor. This enables bypassing. This is because the S terminal is a signal terminal to be connected to load of relatively high resistance in the regulator.

In contrast, a case will be considered, in which a ferrite ring core is connected to the S terminal or the internal battery voltage detection line connected thereto. In this case, the ferrite ring core acts to increase wiring inductance connected to the load of relatively high resistance, but there are problems that since the load is relatively large, noise reduction effect cannot be obtained unless the wiring inductance is made considerably great, and that a change in battery voltage is divided by the load and the increased wiring inductance to lead to reduction in the change in battery voltage, input into the load.

That is, in order to reduce electromagnetic wave noises entering from the S terminal while detecting a change in battery voltage with good follow-up quality, it is found that employment of a bypass capacitor rather than a ferrite ring core (magnetic body) is preferable.

Since the BR terminal supplies an electric source current to the regulator, it follows in terms of an equivalent circuit that electromagnetic wave noise voltage electromagnetically or electrostatically induced to an external line for connection of the BR terminal and the battery is applied to a relatively small load of the regulator. Accordingly, a magnetic body is mounted to the BR terminal or an internal electric source line contiguous thereto to provide an increase in wiring inductance, and then much of electromagnetic wave noise voltage is consumed thereby, and does not enter into the regulator. Also, since the BR terminal does not need transmission of a signal due to transmission of a voltage change, it is unnecessary to take account of attenuation in signals.

In contrast, where a bypass capacitor is connected in parallel to the relatively small load, capacity or impedance of the bypass capacitor must be markedly increased as compared with the above-mentioned bypass capacitor on the S terminal, which develops a problem that the bypass capacitor is caused to markedly increase in physical dimensions.

The IG terminal (a L terminal is regarded as an IG ON detection terminal referred to in the invention in the case where voltage change due to opening and closing of the ignition switch is received through the L terminal) suffices to drive a markedly small load as compared with input impedance of the regulator connected to the S terminal, and like the BR terminal, an increase in wiring inductance, due to the magnetic body is more effective than a decrease in bypass impedance in parallel to input impedance of the regulator, caused by the bypass capacitor. Also, that attenuation in transmission signal amplitude associated with the IG terminal, which is caused by an increase in wiring inductance, due to the magnetic body, shall not interfere with start of the circuit operation because opening and closing signals of the ignition switch, due to opening and closing of the ignition switch, input from the IG terminal are exceedingly large (equal to the battery voltage) in amplitude.

Since the L terminal is actuated by a lamp drive transistor in the regulator, and is also an output impedance of the regulator, even when electromagnetic wave noise voltages are superposed on a wiring leading to the battery from the L terminal via a charge lamp, part of electromagnetic wave noise voltage is consumed by the charge lamp, and the remainder of the voltage is also consumed through a small ON resistance of the lamp drive transistor, whereby no problem is caused. There is a path, along which electromagnetic wave noises enter into the regulator by way of a parasitic capacitance between a primary electrode and a control electrode of the lamp drive transistor on the side of the L terminal, but that matters little since such parasitic capacitance is small.

Since the F terminal is connected to a terminal of the battery through a field coil and an external wiring of an outside vehicular AC generator and is attached to the other terminal of the battery through a small ON resistance of the switching transistor of the regulator, much of electromagnetic wave noise voltages superposed on the external wiring is born by the field coil, and will not enter into the regulator.

The P terminal is connected to an armature coil of an outside vehicular AC generator through an external wiring, and the cooling fins and a housing of a vehicular AC generator are strangely shaped and large-sized, and are exceedingly small in electric resistance. Magnetic bodies are mounted to a battery voltage supplying terminal and an IG ON detection terminal, which constitute terminals of a connector on the casing. With such arrangement, mounting of magnetic bodies is made simple as described later.

In another aspect, the magnetic body is disposed closer to the internal electric source circuit unit than a connection between the battery voltage supplying terminal and the field coil to be mounted to the battery voltage supplying terminal or the internal electric source line.

In another aspect of the invention, the magnetic body is embedded in a connector portion of a resin provided integrally on the casing of a resin. Such embedding can be carried out by a well-known manufacturing method such as insert molding and mold molding.

In another aspect, the magnetic body is received in a magnetic body receiving groove formed in a concave manner on a bottom surface of the connector portion of a resin provided integrally on the casing of a resin.

In another aspect, a peripheral wall of the connector portion facing the magnetic body receiving groove comprises a rib, which narrows an opening of the groove, and the peripheral wall (outer peripheral wall portion) and the rib (projection) elastically deform in a direction, in which the opening of the groove is enlarged to an extent permitting passage of the magnetic body upon insertion of the magnetic body into the groove.

In another aspect of the invention, the magnetic body is formed from an electrically conductive, magnetic material to be electrically insulated by the casing of a resin or the connector portion of a resin, for example, from the terminals.

In another aspect, the battery voltage supplying terminal or the IG ON detection terminal is flat-plate shaped, of which a cross section in a direction perpendicular to a lengthwise direction is substantially rectangular in shape, and the magnetic body has a slot.

In another aspect, the magnetic body has a slot, through which a ring-shaped tip end of the battery voltage supplying terminal extends, so that while suppressing an increase in magnetic path length, it is possible to post-mount the magnetic body.

In another aspect, the magnetic body has a plurality of through holes, through which a plurality of terminals extend separately, so that while suppressing leakage of electromagnetic signals between the respective terminals, it is possible to reduce the whole physical dimensions of the magnetic body and an amount of a magnetic body used. Also, a magnetic body can be embedded in a connector portion to surround terminals (connector pins), the connector portion being ordinarily formed from a resin to support bases of the terminals (connector pins). In addition, the term "embedding" referred to in the specification of this application includes the case where the magnetic body is exposed from the connector portion to an extent that the magnetic body does not easily drop off as well as the case where the magnetic body is fully surrounded by the connector portion.

In another aspect, the magnetic body is formed from an electrically conductive, magnetic material to be electrically insulated from the terminal by the connector portion, so that the connector portion for supporting of terminals can serve also to provide an electric insulating function between the terminals and the electrically conductive, magnetic material, and an electrically conductive material can be used for the magnetic body while complexity in the manufacturing process and construction is suppressed. Further, reduction in electromagnetic wave noises caused by eddy current loss of the magnetic body can be realized.

In another aspect, the terminal comprises an electric source wiring for supplying of an electric source power to the circuit parts in the casing. That is, the electrically conductive, magnetic material does not specifically need transmission of sharp signal voltages and prevents magnetic saturation of the magnetic body due to large magnetic flux caused by a large change in electric source current, so that application to electric source wires is most preferable. Also, the magnetic body is pressure can be fitted in a magnetic body receiving groove formed in a concave manner on a bottom surface of the connector portion.

In another aspect, a peripheral wall of the connector portion facing the magnetic body receiving groove comprises a rib, which narrows an opening of the magnetic body receiving groove, and the peripheral wall and the rib have an elastic deforming characteristics in a direction, in which the opening permitting insertion of the magnetic body into the magnetic body receiving groove is enlarged. Therefore, a magnetic body supporting quality of the connector portion can be further improved, and manufacture is made simple owing to ease, with which a die is taken out. The magnetic body can have a slot is mounted to a flat-plate terminal, so that it is possible to realize a magnetic body of a small size having a large inductance.

In another aspect, the terminal has a head, which is larger in width than the base, and the magnetic body has a slot, through which the head of the terminal can extend. Therefore, it is possible to avoid an increase in physical dimensions of the magnetic body while suppressing a decrease in inductance, due to an increase in magnetic path length of the magnetic body. The plurality of terminals can extend separately through a plurality of through holes in the magnetic body.

In another aspect, the connector portion comprises a resin molded part, in which electrically insulating, magnetic particles are dispersed and filled, and so the connector portion itself constitutes a magnetic body. Therefore, it is possible to obtain a large inductance with manufacture being simple and without an increase in physical dimensions of the magnetic body, and to obtain an excellent electromagnetic wave noise shut-off effect.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DETAILED DESCRIPTION OF THE INVENTION

Figure 1:
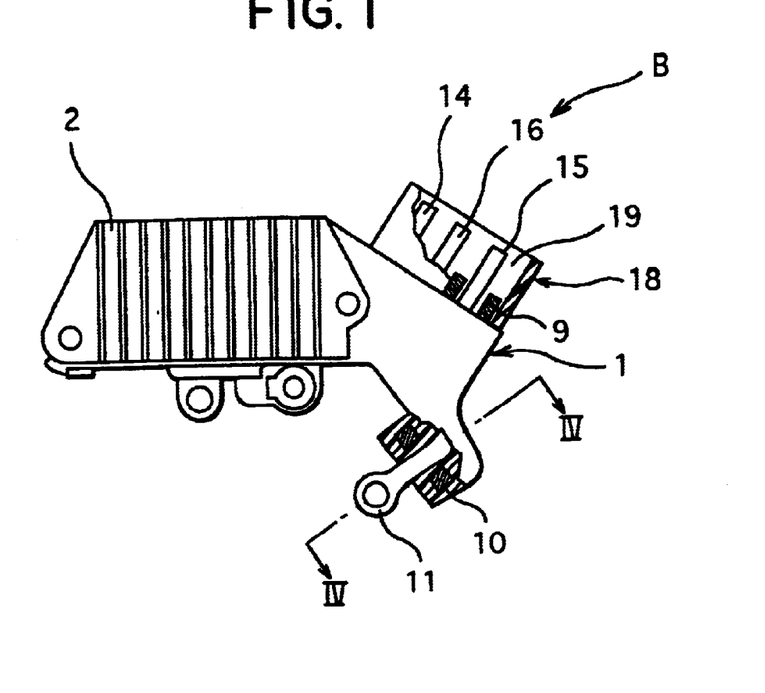
FIG. 1 is a front partial cross-sectional view of a control device for a vehicular AC generator, according to the present invention.
Figure 2:
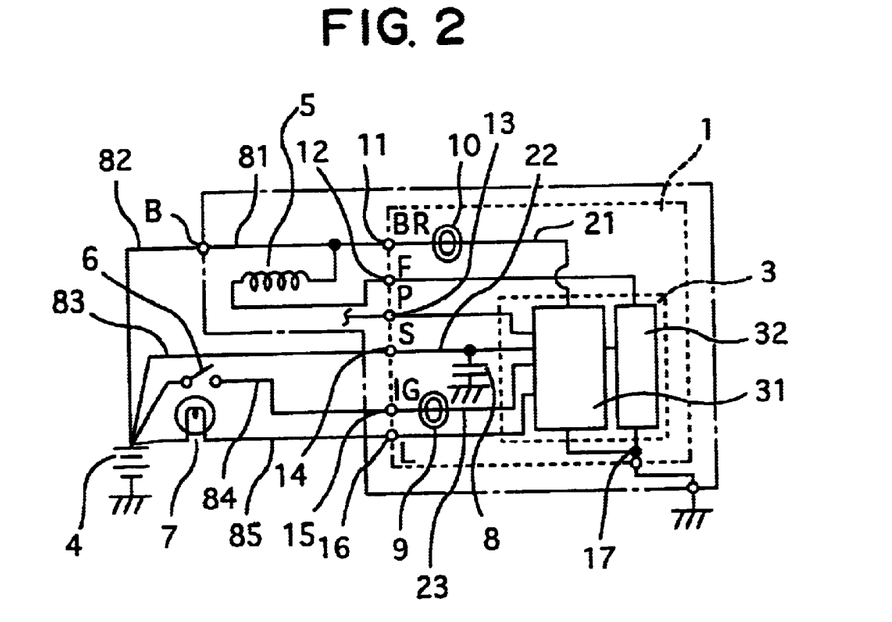
FIG. 2 is a block circuit diagram of the control device for the vehicular AC generator according to the present invention.

As shown in FIGS. 1 and 2, the regulator comprises a regulator casing 1 formed by resin molding and fixed integrally to a vehicular AC generator (not shown), and metallic radiating fins 2 fixed to a surface of the regulator casing 1. An IC chip (al-so, referred to as a regulator chip) 3, on which regulator circuits are integrated, is fixed to an invisible, back surface of the radiating fins 2.

The IC chip 3 comprises a control unit 31 (a switching transistor control circuit unit and an internal electric source circuit unit referred to in the invention), and a switch unit 32 (a field current switching circuit unit referred to in the invention).

The control unit 31 comprises a switching transistor control circuit unit for performing intermittent control of a switching transistor in the switch unit 32 based on input battery voltage and a predetermined target voltage, and an internal electric source circuit unit supplied with electricity from a battery 4 to form an internal electric source voltage being applied to the switching transistor control circuit unit.

The switch unit 32 is connected at one end to one end of the battery 4 through a field coil 5 of a vehicular AC generator. At its other end, the switch is connected to the other end of the battery 4. The switch includes a switching transistor for performing switching control of current conducted to the field coil 5. This type of a circuit structure of the regulator itself is well-known and so further explanation will be omitted.

Fixed to the regulator casing 1 are a BR terminal (battery voltage supplying terminal) 11, a F terminal 12, a P terminal 13, a S terminal 14, an IG terminal 15, and a L terminal 16.

The reference numeral 11 designates the BR terminal connected to a B terminal (a DC terminal) of a vehicular AC generator, which supplies electricity to a + terminal of the battery 4, to supply electric source voltage to the control unit 31 of the IC chip 3 via an internal electric source line 21. The BR terminal 11 is connected to the B terminal of the vehicular AC generator via a B line 81 in the vehicular AC generator, and one end of the field coil 5 is connected to the + terminal of the battery 4 via the B line 81, the B terminal, and an external line 82. The reference numeral 12 designates the F terminal for connecting between the other end of the field coil 5 and one end of a switching transistor in the switch unit 32 of the IC chip 3. Field current supplied to the field coil 5 from the B terminal of the vehicular AC generator flows to the switching transistor via the F terminal 12.

The reference numeral 13 designates the P terminal connected to one phase output end of an armature coil (not shown) of the vehicular AC generator to detect generation of electrical power from the vehicular AC generator. The reference numeral 14 designates the S terminal for detecting voltage of the + terminal (battery voltage) of the battery 4 through an external line 83 to input the battery voltage into the switching transistor control circuit unit of the control unit 31 via the internal battery voltage detection line 22.

The reference numeral 15 designates the IG terminal (IG ON detection terminal) connected to one end of an ignition switch 6 via an external line 84 to input voltage changes due to ON/OFF of the ignition switch 6 into the switching transistor control circuit unit of the control unit 31 via an internal IG ON detection line 23. The internal electric source circuit unit of the control unit 31 is actuated upon ON of the ignition switch 6 to make constant the battery voltage supplied from the BR terminal 11 to supply electricity to respective parts of the control unit 31.

The reference numeral 16 designates the L terminal connected to the + terminal of the batter 4 via a charge lamp 7 to detect abnormality of a charging system of a vehicle via an external line 85 to inform the driver of such abnormality. The reference numeral 17 designates a ground terminal for grounding a grounding line for the control unit 31 and the switch unit 32 of the IC chip 3, and radiating fins 2 serve as the ground terminal to be grounded via a housing of the vehicular AC generator.

Figure 3:
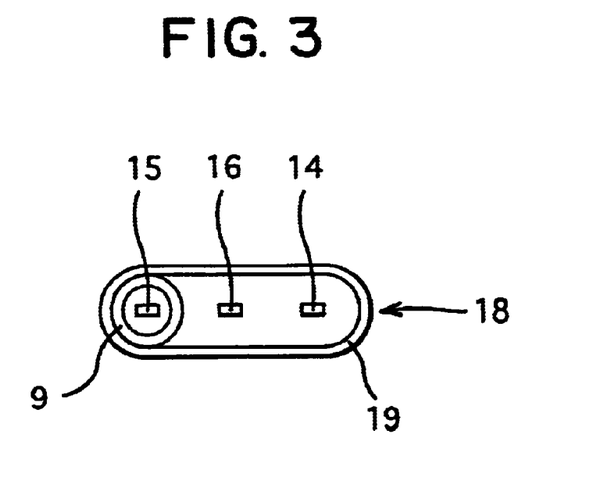
FIG. 3 is a view of the vehicular AC generator as viewed in a direction indicated by an arrow B in FIG. 1 according to the present invention.
Figure 4:
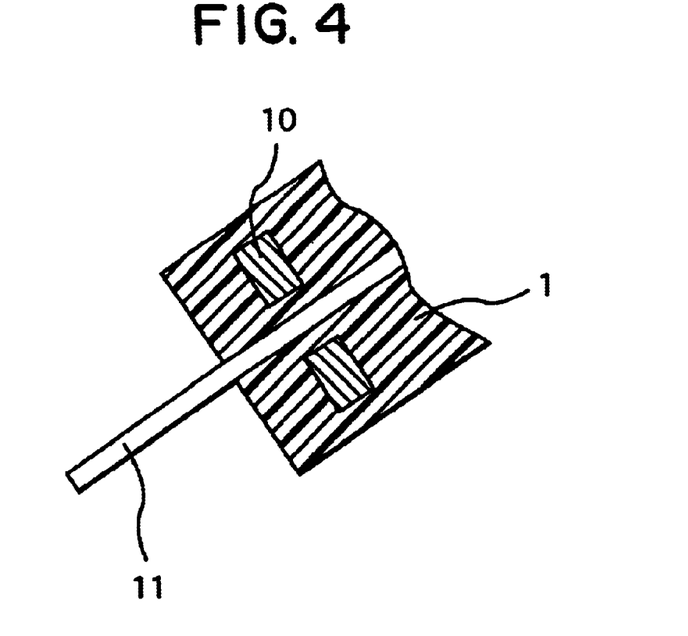
FIG. 4 is a cross sectional view taken along the line IV—IV in FIG. 1 according to the present invention.

The regulator casing 1 has a connector 18 formed by resin molding, the connector 18 projects from the main portion of the regulator casing 1, and comprises the S terminal (battery voltage supplying terminal) 14, the IG terminal (IG ON detection terminal) 15, the L terminal 16, and a cylindrical-shaped connector section 19 surrounding these terminals. The S terminal (battery voltage supplying terminal) 14, the IG terminal (IG ON detection terminal) 15, and the L terminal 16 constitute connector pins (terminals) of the connector 18, and are arranged in a row at a predetermined spacing with respect to one another within the connector section 19 as shown in FIG. 3.

The reference numeral 8 designates a bypass capacitor fixed to the regulator casing 1 to connect the S terminal 14 or the internal battery voltage detection line 22 to a ground end composed of the radiating fins 2.

The reference numerals 9, 10 designate ferrite ring cores (magnetic bodies) fixed to the regulator casing 1, the ferrite ring core 9 being fitted onto the IG terminal 15 and the ferrite ring core 10 being fitted onto the BR terminal 11. The ferrite ring core 9 is fitted onto the IG terminal 15 to surround the same and fixed to a bottom surface the connector 18 as shown in FIG. 3. The ferrite ring core 10 is fit onto the BR terminal 11 to be embedded in the regulator casing 1, which is formed by resin molding. The ferrite ring cores 9, 10 constituting magnetic bodies, respectively, have inductance of 1 μH and AC impedance (reactance) of about 600 Ω at 10 MHz. Also, the bypass capacitor 8 has capacitance of 1 μF and AC impedance of about 1.6 mΩ at 100 MHz.

For further explanation, a bypass capacitor is connected to the S terminal 14 connected to a load of relatively high resistance in the regulator to inhibit entry of electromagnetic wave noise voltage while greatly increasing AC impedance of wiring to suppress attenuation of signal voltage, and a large AC impedance is connected in series in a high frequency zone to the BR terminal and the IG ON detection terminal, which are connected to a relatively small load of the regulator, to inhibit entry of electromagnetic wave noise voltage into the regulator. Because the ferrite ring cores 9, 10 are fit onto the BR terminal and the IG terminal, connectors of the regulator, post-mounting of the ferrite ring cores 9, 10 and resin embedding by insert molding become simple.

Also, since the ferrite ring core 10 is disposed nearer the regulator than a connection between the BR terminal and the field coil 5 mounted on the BR terminal or the internal electric source line 21, magnetic flux due to a large change in field current will not cause magnetic saturation on the ferrite ring core 10, so that it is possible to make the ferrite ring core 10 small in size.

Also, since the ferrite ring core 10 is embedded in the connector of a resin provided integrally on the casing of a resin, it is possible to fix the magnetic body under the circumstances of a vehicular AC generator, which is exposed to intense vibrations and a large change in temperature, and so it is possible to favorably protect and fix the ferrite ring core 10.

Also, since the ferrite ring core 9 is received in the magnetic body groove formed on the bottom surface of the connector of a resin provided integrally on the casing of a resin, it is possible to simply mount and fix the magnetic body after the formation of the regulator. Thus, it is possible to favorably protect and fix the ferrite ring core 9 under intense vibration.

Figure 5:
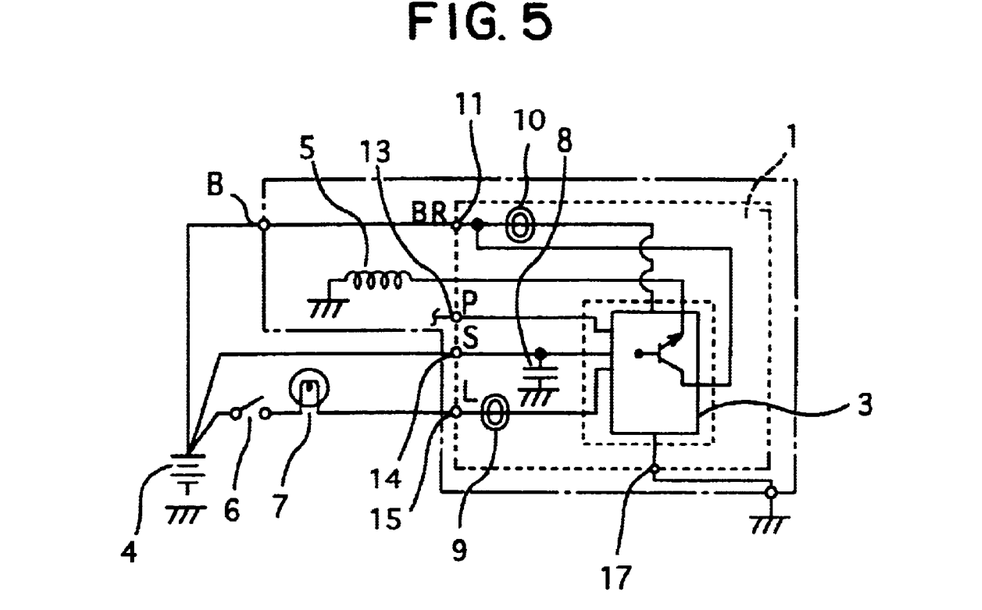
FIG. 5 is a block circuit diagram showing a modification of the control device for the vehicular AC generator according to the present invention.

FIG. 5 shows the ferrite ring core 9 provided on the L terminal, which also serves as an IG terminal, and functions in the same manner as the ferrite ring core 9 in the embodiment 1 described above.

Figure 6:
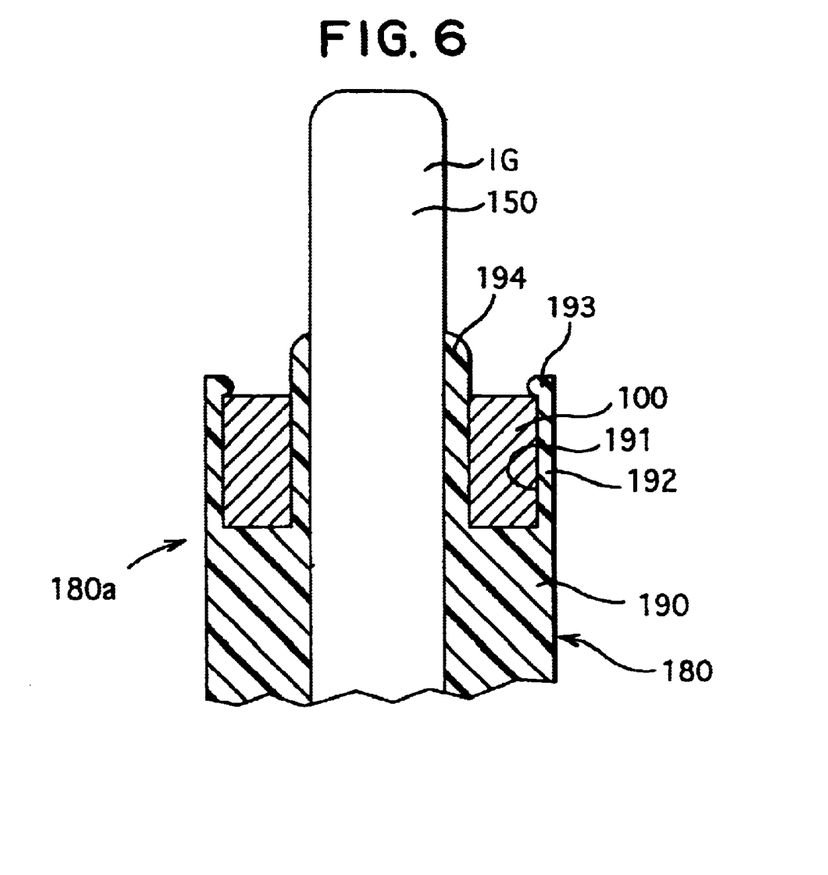
FIG. 6 is a partial cross sectional view of a control device for a vehicular AC generator according to a second embodiment of the present invention.

An explanation will be given below to a further embodiment of a control device of a vehicular AC generator of the invention with reference to FIG. 6.

A connector 180a comprises a connector portion 190 formed of a resin and an IG terminal 150, a base end of which is embedded in the connector portion 190 and a tip end of which projects. Formed on a tip end surface of the connector portion 190 is a magnetic body receiving groove 191, which surrounds the IG terminal 150 and into which a magnetic body 100 in the form of a soft iron ring is pressure fitted.

The reference numeral 192 designates an outer peripheral wall surrounding the magnetic body receiving groove 191 and provided a radially inward projection 193 at its tip. The reference numeral 194 designates a radially inward, inner peripheral wall of the magnetic body receiving groove 191, the inner peripheral wall being fitted on the IG terminal 150.

Figure 7:
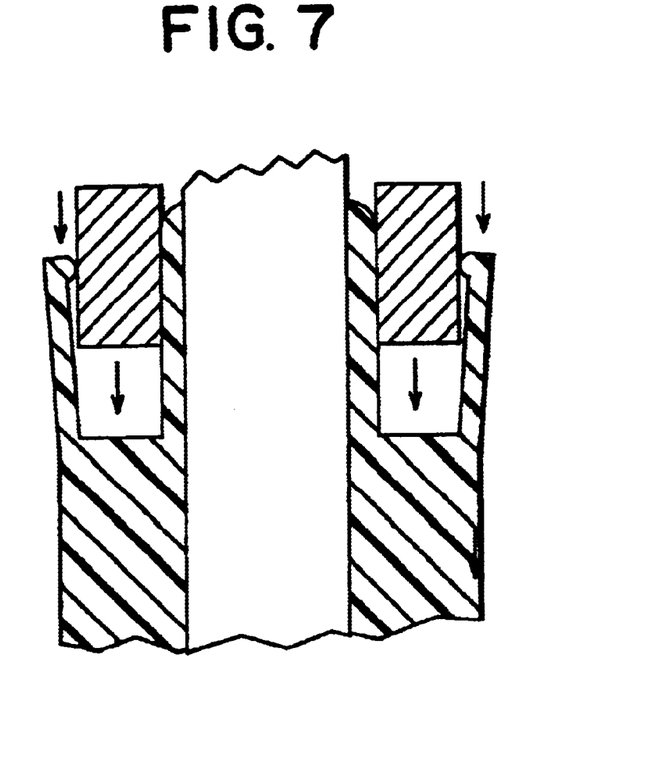
FIG. 7 is a cross sectional view showing an assembly of the second embodiment of the present invention.

FIG. 7 shows the magnetic body 100 being received in the magnetic body receiving groove 191. Insertion of the magnetic body 100 is made possible by pushing the projection 193 radially outward and enlarging an opening of the magnetic body receiving groove 191. At this time, the outer peripheral wall 192 elastically deforms radially outward about its base end. After the magnetic body 100 is received, the outer peripheral wall 192 decreases in diameter to its original state, and the projection 193 presses a tip end of the magnetic body 100 to prevent the same from separating from the magnetic body receiving groove 191.

The magnetic body receiving groove 191 with its opening narrowed is formed from a resin with a die placed in a region of the magnetic body 100. After the resin has solidified, the die is drawn upward in FIG. 7, and then the projection 193 and the outer peripheral wall 192 elastically deform in the same manner as at the time of insertion, so that smooth extraction of the die is made possible.

Also, the inner peripheral wall 194 provides electric insulation between the magnetic body 100 and the IG terminal 150. In this embodiment, the magnetic body 100 comprises a soft iron ring to generate a large eddy current loss against a high frequency electromagnetic wave noise voltage, thus affording a further electromagnetic wave noise preventing effect. Of course, the magnetic body 100 may be mounted on the BR terminal in place of the IG terminal 150.

Figure 8:
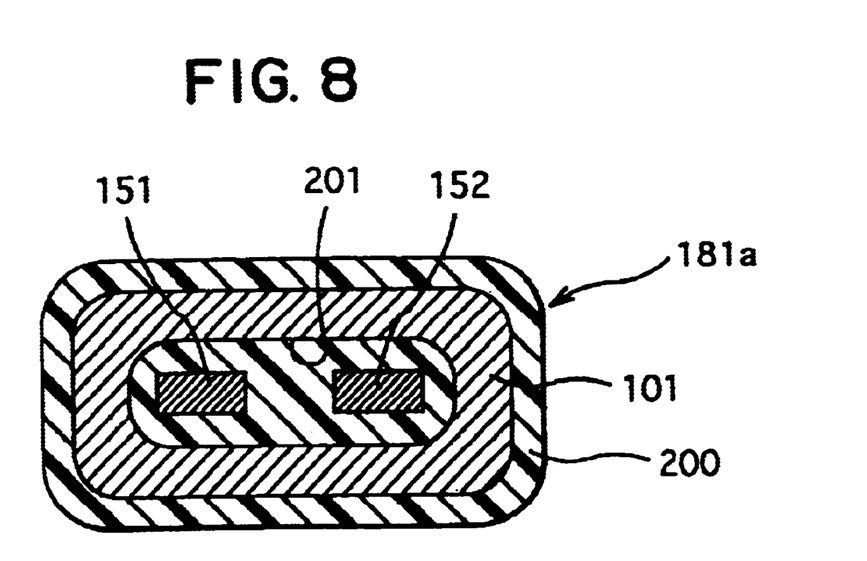
FIG. 8 is a cross sectional view taken along the line VIII—VIII in FIG. 9 of the present invention.
Figure 9:
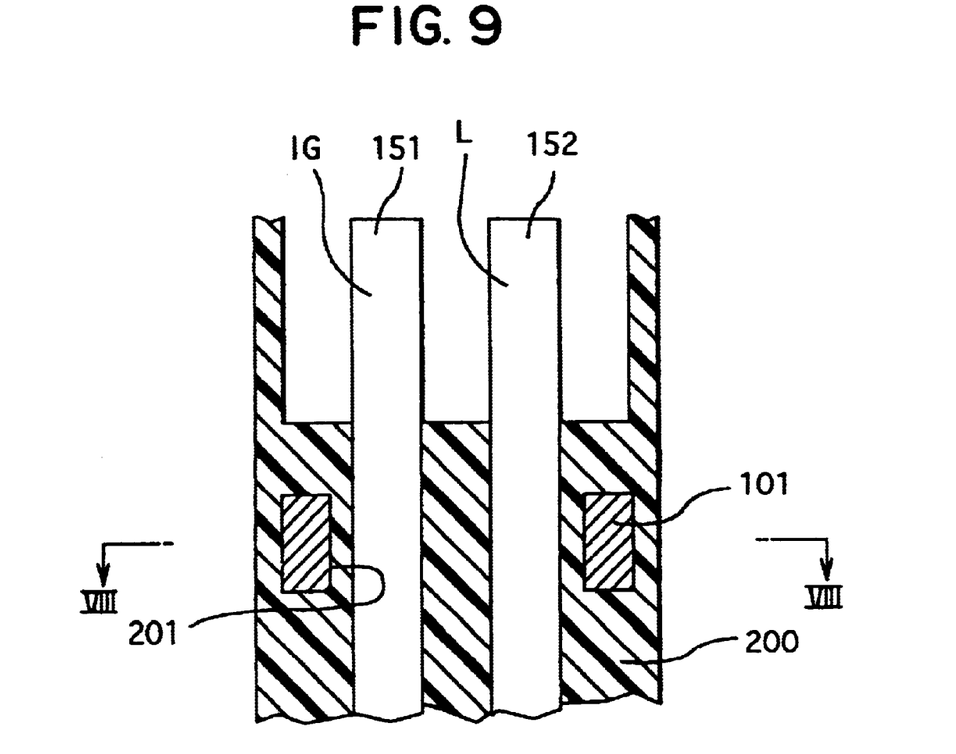
FIG. 9 is a cross sectional view of a control device for a vehicular AC generator according to a third embodiment of the present invention.

Referring to FIGS. 8 and 9, another embodiment of the invention is provided. Here, a connector 181a comprises a connector portion 200 formed of a resin, and an IG terminal 151 and a L terminal 152, base ends of which are embedded in the connector portion 200. Tip ends of these terminals project, and each of which is in the form of a flat-plate terminal. The reference numeral 101 designates a magnetic body of a soft iron ring embedded in the connector portion 200 to be electrically insulated from the IG terminal 151 and the L terminal 152. The magnetic body 101 has slots 201 conforming to the IG terminal 151 and the L terminal 152, and widthwise directions of the IG terminal 151 and the L terminal 152 are parallel to slots 201 of the magnetic body 101.

With such arrangement, electromagnetic wave noise voltages superposed on the both terminals 151, 152 are reduced while making the magnetic body 101 small.

Figure 10:
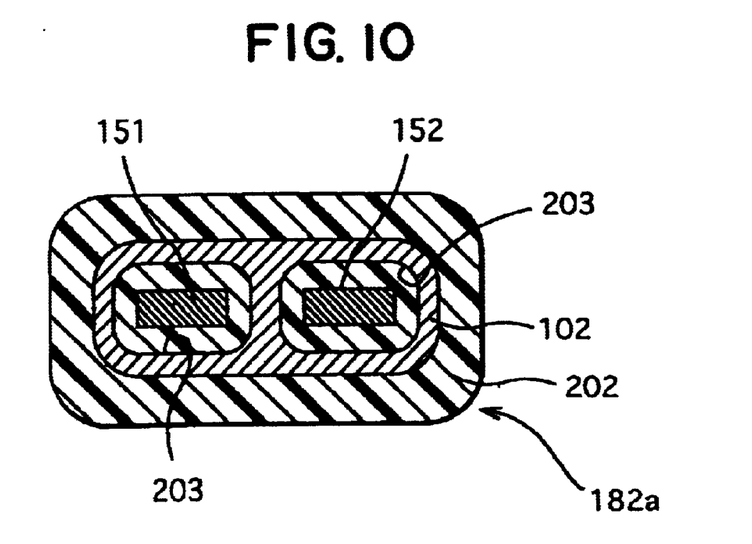
FIG. 10 is a cross sectional view taken along the line X—X in FIG. 11 of the present invention.
Figure 11:
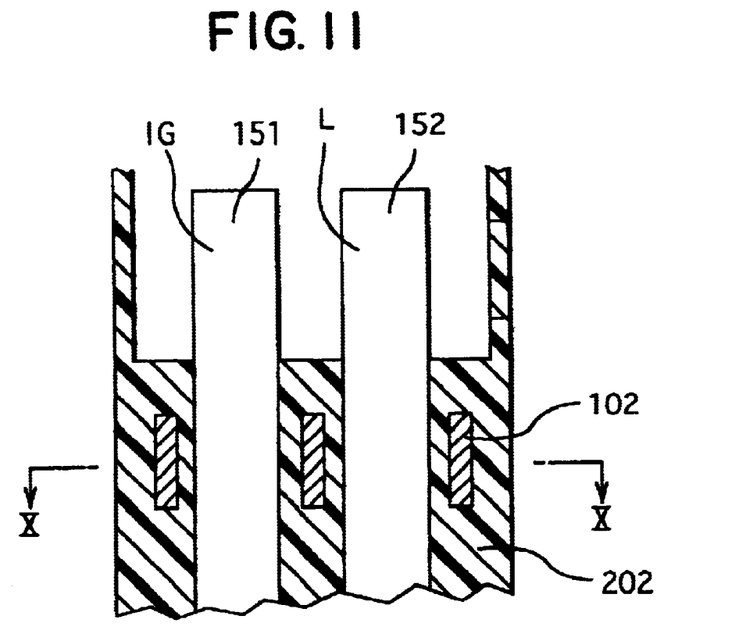
FIG. 11 is a cross sectional view of a control device for a vehicular AC generator according to a fourth embodiment of the present invention.

Referring to FIGS. 10 and 11, a fourth embodiment provides a connector 182a that comprises a connector portion 202 formed of a resin, and an IG terminal 151 and a L terminal 152. Base ends of these are embedded in the connector portion 202, tip ends of which project, and each of which is in the form of a flat-plate terminal.

The reference numeral 102 designates a magnetic body in the form of a soft iron ring embedded in the connector portion 202 to be electrically insulated from the IG terminal 151 and the L terminal 152. The magnetic body 102 comprises a pair of slots 203, through which the IG terminal 151 and the L terminal 152, respectively extend. Also, the widthwise directions of the IG terminal 151 and the L terminal 152 are parallel to the slots 203 of the magnetic body 102.

Figure 12:
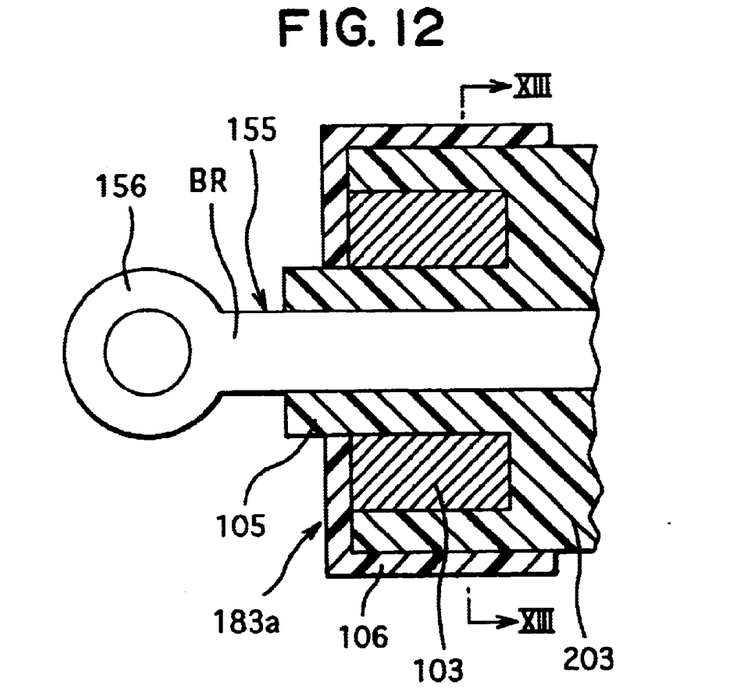
FIG. 12 is a cross sectional view of a control device for a vehicular AC generator according to a fifth embodiment of the present invention.
Figure 13:
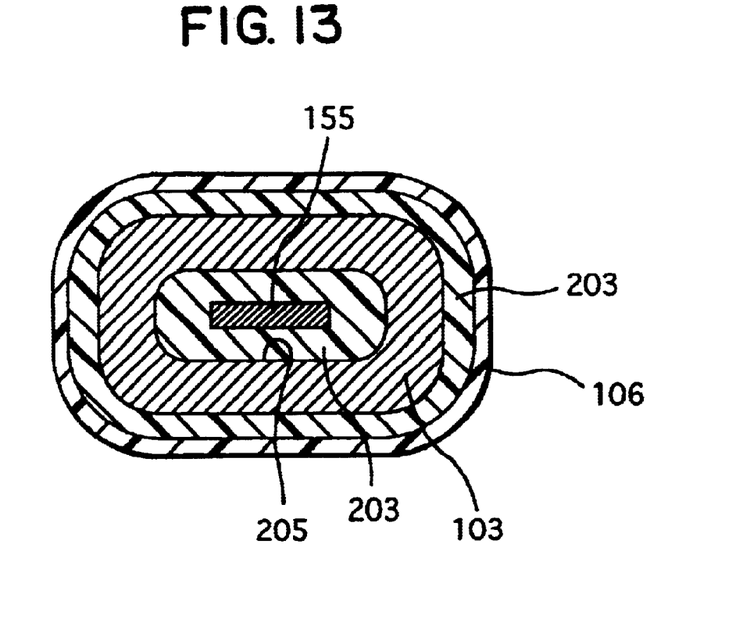
FIG. 13 is a cross sectional view taken along the line XIII—XIII in FIG. 12 of the present invention.

Referring to FIGS. 12 and 13, a fifth embodiment is shown. Here, a connector 183a comprises a connector portion 203 formed of resin, and a BR terminal 155, a base end of which is embedded in the connector portion 203, a tip end of which projects, and which is in the form of a flat-plate terminal. The reference numeral 103 designates a magnetic body in the form of a soft iron ring embedded in the connector portion 203 to be electrically insulated from the BR terminal 155. The magnetic body 103 comprises a slot 205, through which the BR terminal 155 extends, and a widthwise direction of the terminal 155 is parallel to slot 205 of the magnetic body 103.

A tip end 156 of the BR terminal 155 is formed larger in width than a base end of the terminal, and the slot 205 has an inner width capable of insertion of the BR terminal 155 therethrough.

Figure 14:
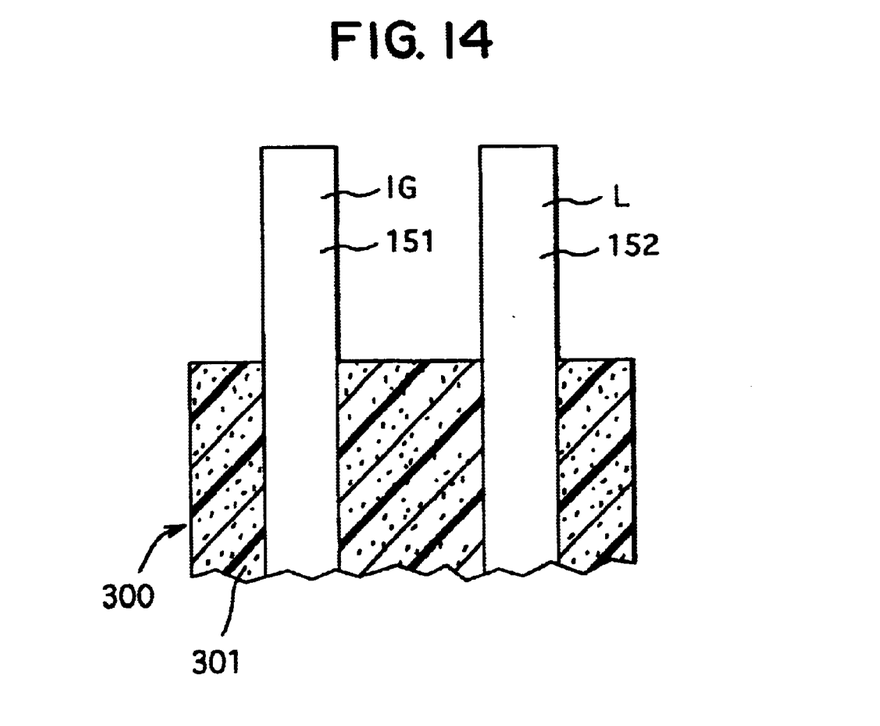
FIG. 14 is a cross sectional view of a control device for a vehicular AC generator according to a sixth embodiment of the present invention.

Referring to FIG. 14, a sixth embodiment is shown. Here, a connector 300 comprises a connector portion 301 formed of a resin, and an IG terminal 151 and a L terminal 152, base ends of which are embedded in the connector portion 301, tip ends of which project, and which are in the form of a flat-plate terminal.

The connector portion 301 is formed by mixing soft magnetic, ferrite particles with the resin, and is fitted into the regulator casing 1.

While the above-described embodiments refer to examples of usage of the present invention, it is understood that the present invention may be applied to other usage, modifications and variations of the same, and is not limited to the disclosure provided herein.

What is claimed is:

1. A control device for a vehicular AC generator, comprising:
    field current switching circuit unit having a switching transistor for performing switching control of current conducted to a field coil;
    a switching transistor control circuit unit for performing intermittent control of the switching transistor based on a battery voltage and a predetermined target voltage;
    an internal electric source circuit unit that uses electricity supplied from a battery to form an internal electric source voltage, the internal electric source voltage supplied to the switching transistor control circuit unit;
    a casing containing at least one IC or the switching transistor control circuit unit that is mold-sealed by resin;
    a battery voltage supplying terminal that supplies electricity to the internal electric source circuit unit from the battery via an internal electric source line; and
    a magnetic body mounted to the internal electric source line or the battery voltage supplying terminal, wherein the battery voltage supplying terminal and the magnetic body are fixed to the casing, and the internal electric source line or the battery voltage supplying terminal is equipped with only the magnetic body.

2. A control device for a vehicular AC generator, comprising:
    a field current switching circuit unit having a switching transistor that performs switching control of current conducted to a field coil;
    a switching transistor control circuit unit that performs intermittent control of the switching transistor based on a battery voltage and a predetermined target voltage;
    an internal electric source circuit unit that uses electricity supplied from the battery to form an internal electric source voltage, said internal electric source voltage being applied to the switching transistor control circuit unit;
    a casing containing at least one IC or the switching transistor control circuit unit that is mold-sealed by resin;
    a battery voltage supplying terminal for supplying electricity to the internal electric source circuit unit from the battery via an internal electric source line; and
    an inductance element connected in series to the internal electric source line, wherein the battery voltage supplying terminal and the inductance element are fixed to the casing, and the internal electric source line is equipped with only the inductance element.

3. The control device for a vehicular AC generator, according to claim 1, further comprising:
    an IG ON detection terminal connected to an IG ON detection line, the IC detection terminal being connected to one end of an on-board ignition switch directly or through a lamp, said IG ON detection terminal detecting when an ignition switch is ON; and
    a magnetic body mounted to the IG ON detection line or the IG ON detection terminal;
    wherein the IG ON detection terminal and the magnetic body are fixed to the casing.

4. The control device for a vehicular AC generator, according to claim 1, further comprising:
    an IC ON detection terminal connected to an IG ON detection line, said IG ON detection terminal being connected to one end of an on-board ignition switch directly or through a lamp, said IG ON detection terminal detecting when the ignition switch is ON; and
    an inductance element mounted in series to the IG ON detection line;
    wherein the IC ON detection terminal and the inductance element are fixed to the casing.

5. The control device for a vehicular AC generator, according to claim 1, further comprising:
    a battery voltage detecting terminal connected to a high potential end of a battery for supplying battery voltage for input into the switching transistor control circuit unit through a battery voltage detection line; and
    a high frequency bypass capacitor connecting between the battery voltage detection line or the battery voltage detecting terminal and a voltage potential source at a voltage potential equal to a negative potential of the battery;
    wherein the battery voltage detecting terminal and the high frequency bypass capacitor are fixed to the casing.

6. The control device for a vehicular AC generator, according to claim 1, wherein the magnetic body is disposed closer to the internal electric source circuit unit than a connection between the battery voltage supplying terminal and the field coil mounted to the battery voltage supplying terminal or the internal electric source line.

7. The control device for a vehicular AC generator, according to claim 6, wherein the magnetic body is embedded in a connector portion of a resin provided integrally on the casing of a resin.

8. The control device for a vehicular AC generator according to claim 6, wherein the magnetic body is received in a magnetic body receiving groove, said magnetic body receiving groove formed in a concave manner on a bottom surface of a connector portion of a resin provided integrally on the casing.

9. The control device for a vehicular AC generator according to claim 8, wherein a peripheral wall of the connector portion facing the magnetic body receiving groove comprises a rib, said rib narrowing an opening of the magnetic body receiving groove, the peripheral wall and the rib have an elastic deforming characteristics in a direction allowing enlargement of an opening for insertion of the magnetic body into the magnetic body receiving groove.

10. The control device for a vehicular AC generator according to claim 6, wherein the magnetic body is formed from an electrically conductive magnetic material electrically insulated by a resin casing or a resin connector portion.

11. The control device for a vehicular AC generator according to claim 6, wherein the battery voltage supplying terminal or the IG ON detection terminal is flat-plate shaped, a cross section in a direction perpendicular to a lengthwise direction is substantially rectangular in shape, the magnetic body having a slot.

12. The control device for a vehicular AC generator according to claim 11, wherein:

the battery voltage supplying terminal has a ring-shaped tip end having a larger width than a base; and the magnetic body mounted to the battery voltage supplying terminal has a slot through which the tip end extends.

13. The control device for a vehicular AC generator, according to claim 6, wherein the magnetic body has a plurality of through holes, each of the plurality of terminals extending separately through a respective one of said plurality of through holes.

* * * * *